United States Patent
Mulcahy et al.

(10) Patent No.: US 8,984,539 B2
(45) Date of Patent: Mar. 17, 2015

(54) LOADING A DEVICE DRIVER FROM A DEVICE

(75) Inventors: Luke Mulcahy, Houston, TX (US); Gregory P. Ziarnik, Houston, TX (US); William R. Jacobs, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 253 days.

(21) Appl. No.: 13/387,301

(22) PCT Filed: Feb. 24, 2010

(86) PCT No.: PCT/US2010/025158
§ 371 (c)(1),
(2), (4) Date: Jan. 26, 2012

(87) PCT Pub. No.: WO2011/105998
PCT Pub. Date: Sep. 1, 2011

(65) Prior Publication Data
US 2012/0124596 A1    May 17, 2012

(51) Int. Cl.
G06F 3/00    (2006.01)
G06F 9/44    (2006.01)
G06F 9/46    (2006.01)
G06F 13/00   (2006.01)

(52) U.S. Cl.
CPC .................................. G06F 9/4415 (2013.01)
USPC .......................................... 719/321; 719/318

(58) Field of Classification Search
None
See application file for complete search history.

(56) References Cited

U.S. PATENT DOCUMENTS

| 7,563,140 | B1 | 7/2009 | Wan et al. |
| 8,260,978 | B1* | 9/2012 | Thompson et al. ............. 710/20 |
| 2005/0055471 | A1* | 3/2005 | Payne et al. ..................... 710/5 |
| 2006/0143621 | A1 | 6/2006 | Wang |
| 2007/0260763 | A1 | 11/2007 | Kasama |
| 2008/0071935 | A1 | 3/2008 | Ohta |
| 2008/0109567 | A1 | 5/2008 | Deng et al. |
| 2009/0088024 | A1 | 4/2009 | Ling et al. |
| 2009/0094672 | A1 | 4/2009 | Bunger et al. |

(Continued)

FOREIGN PATENT DOCUMENTS

| CN | 1341942 A | 3/2002 |
| CN | 101159754 A | 4/2008 |

(Continued)

OTHER PUBLICATIONS

ISA/KR, International Search Report dated Oct. 28, 2010, PCT/US2010/025158 filed Feb. 24, 2010.

(Continued)

*Primary Examiner* — Craig Dorais
(74) *Attorney, Agent, or Firm* — Hewlett-Packard Patent Development (57) ABSTRACT

A device including an interface component configured to couple the device to a computing machine, a storage component configured to store a device driver for the device, and a driver application executed from the storage component and configured to identify the device as a storage device if a device driver has not been loaded onto the computing machine and load the device driver onto the computing machine in response to the device coupling to the computing machine.

15 Claims, 6 Drawing Sheets

(56) References Cited

U.S. PATENT DOCUMENTS

| | | |
|---|---|---|
| 2009/0144456 A1 | 6/2009 | Gelf et al. |
| 2009/0156252 A1 | 6/2009 | Harris |
| 2009/0193152 A1 | 7/2009 | Wang et al. |
| 2009/0248924 A1 | 10/2009 | Melin |
| 2009/0286421 A1 | 11/2009 | Rugg et al. |
| 2010/0042987 A1 | 2/2010 | Yamada |
| 2011/0145474 A1* | 6/2011 | Intrater .................. 711/103 |

FOREIGN PATENT DOCUMENTS

| | | |
|---|---|---|
| EP | 1696332 A2 | 8/2006 |
| EP | 1975770 | 10/2008 |
| WO | WO-2006092552 | 9/2006 |

OTHER PUBLICATIONS

Marius Nestor, Linux Kernel 2.631 Has USB 3.0 Support, http://news.softpedia.com/newsPDF/Linux-Kernel-2-6-31-Has-USB-3-0-Support-121287.pdf, Publication Date: Sep. 10, 2009.

Sarah Sharp, Linux Support for Use 3.0, Linux Plumbers Conference, http://linuxplumbersconf.org/2009/slides/Sarah-A-Sharp-lpc-usb3-pres.pdf. downloaded from Internet Jan. 19, 2012.

USB 3.0 (SuperSpeed USB), http://www.krftech.com/st/embedded_usb_usb3.html, downloaded from the Internet on Jan. 19, 2012.

USB 3.0 SuperSpeed, http://www.mcci.com/mcci-v5/firmware/usb_3.html, downloaded from the Internet on Jan. 19, 2012.

Chinese Office Action cited in Appl. No. 201080063083.9 dated Jun. 25, 2014; 8 pages.

European Search Report cited in Appl. No, 10846756.4; dated Jul. 2, 2014; 7 pages.

* cited by examiner

LOADING A DEVICE DRIVER FROM A DEVICE

CROSS-REFERENCE TO RELATED APPLICATION

This application is a national stage application under 35 U.S.C. §371 of PCT/US2010/025158, filed Feb. 24, 2010.

BACKGROUND

A computing machine can be configured to utilize and communicate with a device. Before utilizing the device, the computing machine can prompt a user for a device driver to be utilized for the device. The user can proceed to access one or more input devices on the computing machine and proceed to configure one or more settings on the device and/or the computing machine. Additionally, the user can further access and load one or more applications or device drivers onto the computing machine for the computing machine to utilize when communicating with or when controlling the device.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the embodiments.

DETAILED DESCRIPTION

Figure 1:
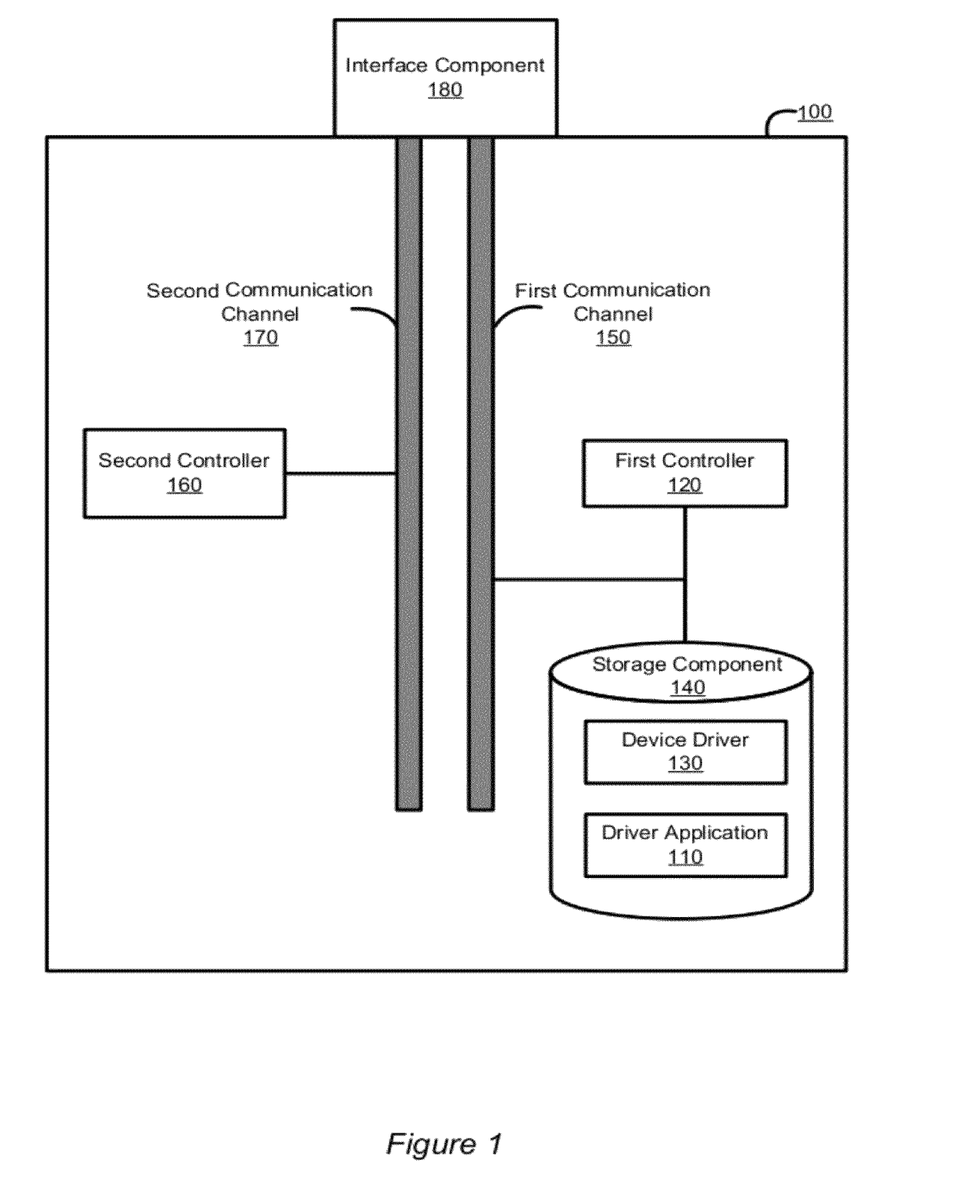
FIG. 1 illustrates a device with an interface component, a first controller, a second controller, and a storage component according to an embodiment of the invention.

FIG. 1 illustrates a device 100 with an interface component 180, a first controller 120, a second controller 160, and a storage component 140 according to an embodiment of the invention. A device 100 can be or include a storage device, an input device, an output device, and/or a communication device.

Further, the device can be a USB (universal serial bus) device, a USB (universal serial bus) 3.0 device, a SATA (serial advanced technology attachment) device, an ESATA (external serial advanced technology attachment) device, and/or a firewire device configured to interface and communicate with a computing machine in response to coupling with the computing machine.

The device 100 can be classified and/or identified to the computing machine as one or more of the devices noted above when coupled to the computing machine. In other embodiments, the device 100 can be additional devices configured to interface and communicate with a computing machine in addition to and/or in lieu of those noted above.

As illustrated in FIG. 1, the device 100 is coupled to an interface component 180, a first controller 120, a second controller 160, a first communication channel 150, a second communication channel 170, and a storage component 140. Further, as shown in FIG. 1, the storage component 140 can store a driver application 110 and at least one device driver 130 for the device 100. In other embodiments, the device 100 can include additional devices and/or components configured to couple with and/or communicate with a computing machine.

When coupling to a computing machine, an interface component 180 of the device 100 can couple the device 100 to the computing machine. A computing machine can include any computing device configured to interface with and communicate with the device 100. Additionally, an interface component 180 is a component of the device 100 which couples with the computing machine and interfaces the device 100 with the computing machine.

The interface component can include at least one from the group consisting of a USB interface, a USB 3.0 interface, a SATA interface, an ESATA interface, a firewire interface, and/or a serial interface. In other embodiments, the interface component 180 can include additional interface types in addition to and/or in lieu of those noted above.

The interface component 180 can physically couple the device 100 to the computing machine by coupling with one or more receiving ports of the computing machine. In another embodiment, the interface component 180 can include a wireless communication device configured to wirelessly communicate with the computing machine and/or a receiving port of the computing machine.

A receiving port of the computing machine is a component and/or a device of the computing machine configured to engage the interface component and interface the device 100 with the computing machine. The receiving port of the computing machine can include a USB port, a USB 3.0 port, a SATA port, an ESATA port, a firewire port, and/or a serial port.

In another embodiment, the receiving port of the computing machine can include a wireless communication device configured to communicate and interface with the interface component 180 wirelessly. In other embodiments, the receiving port of the computing machine can include additional devices and/or components configured to engage the interface component 180 and configured to interface the device 100 with the computing machine.

In response to coupling to the computing machine, a first controller 120 and/or the driver application 110 of the device 100 can proceed to determine whether a device driver 130 for the device 100 is already loaded onto the computing machine. When determining whether a device driver 130 is loaded onto the computing machine, the first controller 120 can query the computing machine to search for a device driver 130 for the device 100 available on the computing machine.

In another embodiment, the computing machine can be configured to determine whether a device driver 130 for the device 100 is already loaded onto the computing machine in response to the device 100 coupling to the computing machine. The first controller 120 can send an instruction for the computing machine to search for a device driver 130 for the device and report results of the search back to the first controller 120.

As noted above, the device 100 can be classified and/or identified to the computing machine as a storage device, an input device, an output device, and/or a communication device. Further, the device 100 can be classified and/or identified to the computing machine as a USB device, a USB 3.0 device, a SATA device, an ESATA device, a firewire device, and/or a serial device.

The device 100 can be classified as one or more of the devices noted above by a first controller 120 of the device 100. A first controller 120 is a component of the device 100 configured to control the device 100 and communicate with the computing machine. When controlling the device and communicating with the computing machine, the first controller 120 sends and receives data and/or instructions to and from one or more components of the device 100, such as the driver application 110 and the storage component 140.

Additionally, the first controller 120 sends and receives data and/or instruction to and from the computing machine and/or a component of the computing machine. When sending and receiving data and/or instructions, the first controller 120 utilizes a first communication channel 150 of the device 100.

A first communication channel 150 can be a communication bus utilized by one or more components of the device 100 to communicate with one another. Additionally, the first communication channel 150 can be utilized by the first controller 120 when communicating with the computing machine. In one embodiment the first communication channel 150 is a memory bus. In other embodiments, the first communication channel 150 is a data bus.

If a device driver 130 for the device 100 has not been loaded onto the computing machine, the first controller 120 can proceed to classify and/or identify the device 100 as a storage device to the computing machine. In one embodiment, the first controller 120 can additionally identify and/or classify the device 100 to the computing machine as a USB device.

When the device 100 is identified and/or classified to the computing machine as a storage device, the first controller 120 can proceed to configure a device application 110 to load at least one device driver 130 for the device 100 onto the computing machine.

A device driver 130 is firmware and/or a software application utilized by the computing machine to communicate with the device 100 and/or to control the device 100. Additionally, the device driver 130 can identify the device 100 and/or a model of the device 100. Further, the device driver 130 can list which components of the device 100 the computing machine is to utilize when communicating with and/or when controlling the device. In one embodiment, the device driver 130 lists for the computing machine to communicate with and/or to control the device 100 through a second controller 160 of the device 100.

As illustrated in FIG. 1, the device driver 130 is stored on a storage component 140 of the device. In one embodiment, additional device drivers can be stored on the storage component 140 and the device drivers on the storage component 140 can correspond to different operating systems which can be installed on a computing machine.

A device driver 130 can be transferred from the storage component 140 through the first communication 150 to the computing machine by the driver application 110. The driver application 110 is an application which can be utilized in conjunction with the first controller 120 to select and load at least one device driver 130 onto the computing machine.

The driver application 110 can be firmware which is embedded onto the device 100. In other embodiments, the driver application 110 is a software application stored on the device 100 within ROM or on the storage component 140 accessible by the device 100.

Additionally, in one embodiment, the storage component 140 is included in the device 100. In other embodiments, the storage component 140 is not included in the device 100, but is coupled to the device 100 through a physical and/or a wireless connection. The storage component 140 can include non-volatile memory.

The driver application 110 communicates with devices and/or components coupled to the device 100 physically or wirelessly through the first communication channel 150 included in or attached to the device 100. As noted above, the driver application 110 can be utilized in conjunction with the first controller 120 to select and load at least one device driver 130 onto the computing machine if a device driver 130 for the device 100 is not already loaded onto the computing machine.

In one embodiment, the driver application 110 can additionally identify an operating system utilized by the computing machine by querying the computing machine or accessing one or more files on the computing machine. The driver application 110 can then proceed to select a device driver 130 from the storage component 140 which corresponds to the identified operating system and proceed to load a corresponding device driver 130 onto the computing machine.

When loading a corresponding device driver 130 onto the computing machine, the first controller 120 can configure the driver application 110 to access the corresponding device driver 130 and proceed to transfer the selected device driver 130 onto the computing machine through the first communication channel 150 of the device 100.

Once the device driver 130 has been transferred to the computing machine, the first controller 120 can configure the driver application 110 to load and/or install the device driver 130 for the computing machine to use. In another embodiment, once the device driver 130 has been transferred onto the computing machine, the computing machine can proceed to load and/or install the device driver 130 for use when communicating with and/or controlling the device 100.

Additionally, the driver application 110 and/or the first controller 120 can instruct the computing machine to configure, reconfigure, and/or initialize the device 100 utilizing the device driver 130 once the device driver 130 has been loaded onto the computing machine.

In one embodiment, when configuring, reconfiguring, and/or initializing the device 100, the computing machine can find that the device driver 130 loaded onto the computing machine specifies for the computing machine to communicate and/or to control the device 100 utilizing a second controller 160 of the device 100. Additionally, the device driver 130 can specify for the computing machine to utilize a second communication channel 170 of the device 100 when communicating with and/or when controlling the second controller 160.

A second controller 160 of the device 100 communicates with the computing machine and controls one or more components of the device 100 once a device driver 130 for the device 100 has been loaded onto the computing machine. Additionally, the second controller 160 can classify and/or identify the device 100. In one embodiment, the second controller is a USB 3.0 controller and additionally identifies the device as USB 3.0 device to the computing machine. Further, the second controller 160 can identify the device 100 as a storage device, an input device, an output device, and/or a communication device.

The second controller 160 can utilize the second communication channel 170 when communicating with the computing machine and/or when controlling one or more components of the device 100. A second communication channel 170 can be a communication bus utilized to by one or more components of the device 100 to communicate with one another. In one embodiment the second communication channel 170 is a memory bus and/or a data bus.

Figure 2:
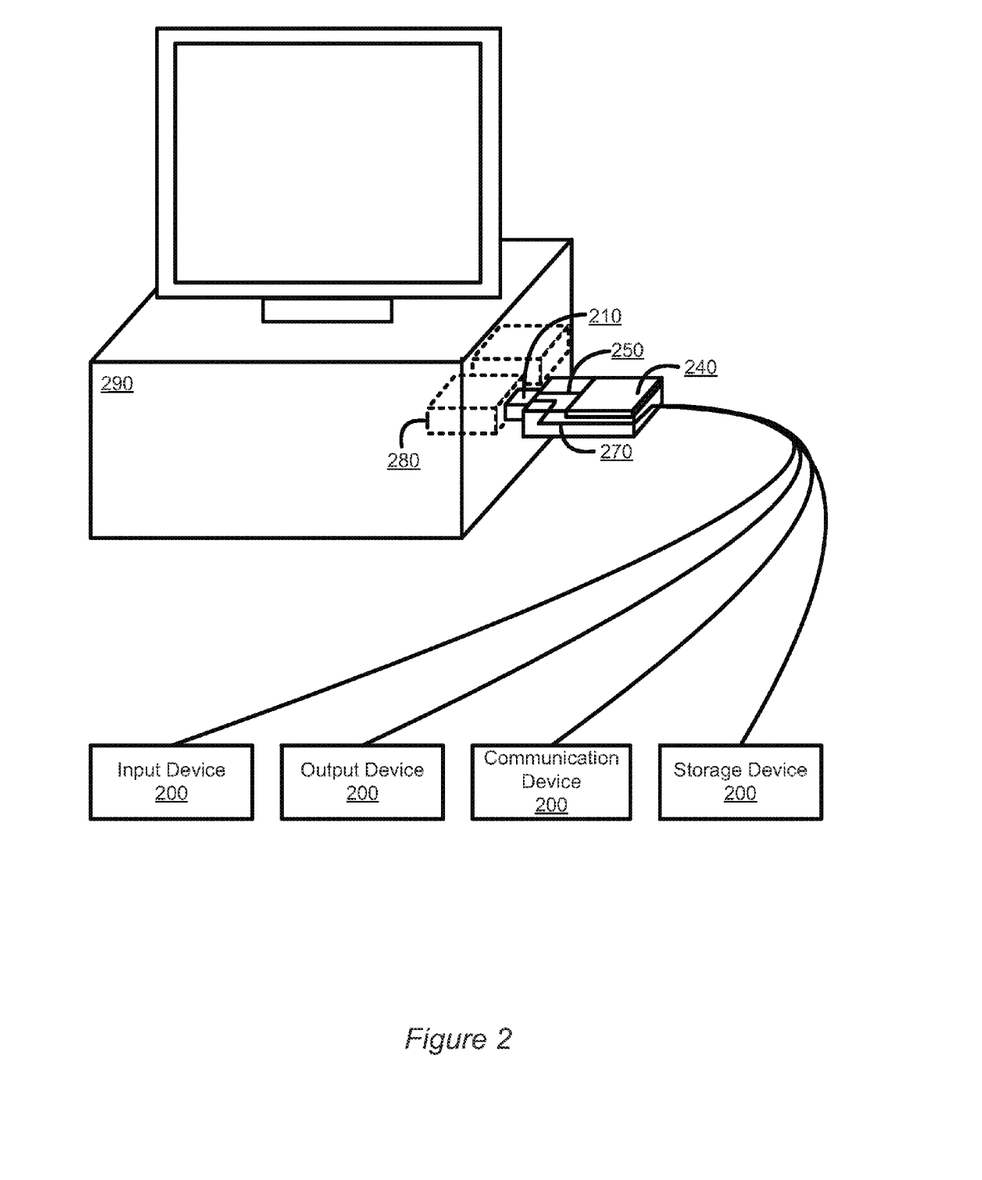
FIG. 2 illustrates a device coupled to a computing machine according to an embodiment of the invention.

FIG. 2 illustrates a device 200 coupled to a computing machine 290 according to an embodiment of the invention. As noted above and as illustrated in FIG. 2, the device 200 can be or include an input device 200, an output device 200, a communication device 200, and/or a storage device 200. Additionally, the device 200 can be a USB device, a USB 3.0 device, a SATA device, an ESATA device, a firewire device, and/or a serial device. The device 200 can be classified and/or identified as one or more of the devices noted above by a first controller and/or a second controller of the device 200.

As illustrated in FIG. 2, the device 200 includes an interface component 210. The interface component 210 is a component of the device 200 configured to couple the device 200 to a computing machine 290. In one embodiment, the interface component 210 protrudes from the device 200 and physically couples to a receiving port 280 of the computing machine 290.

As noted above, a receiving port 280 is a component or device of the computing machine 290 and is configured to couple with the interface component 210 and interface the device 200 with the computing machine 290. Additionally, as shown in FIG. 2, the computing machine 290 can include one or more receiving ports 280 configured to couple with and interface with the device 200. In other embodiments, the interface component 210 and/or the receiving port 280 can include wireless communication devices configured to interface and communicate with one another.

As shown in the present embodiment, when the device 200 is coupled to the computing machine 290, a first communication channel 250 and a second communication channel 270 of the device 200 are coupled to the computing machine 290. Additionally, as shown in FIG. 2, when the device 200 is coupled to the computing machine 290, a storage component 240 of the device 200 can interface with the computing machine 290 through the first communication channel 250.

As noted above, in response to coupling to the computing machine 290, a first controller of the device 200, a driver application of the device, and/or the computing machine can initially determine whether a device driver for the device 200 has already been loaded onto the computing machine 290. The first controller and/or the driver application can search the computing machine 290 for the device driver or the computing machine can be instructed to search for the device driver.

If a device driver for the device 200 has already been loaded onto the computing machine 290, the computing machine 290 can proceed to utilize the loaded device driver to communicate with and/or to control the device 200. As noted above, the computing machine 290 can utilize the loaded device driver to communicate with and/or to control the device 200 through a second controller and a second communication channel 270 of the device 200.

Additionally, as noted above, the second controller can update a classification of the device 200 presented to the computing machine 290. In one embodiment, the second controller identifies the device 200 as a USB 3.0 device. Additionally, the second controller can identify the USB 3.0 device as an input device 200, an output device 200, a communication device 200, and/or a storage device 200.

In another embodiment, if a device driver for the device 200 has not already been loaded onto the computing machine 290, the first controller of the device 200 can proceed to initially classify and/or identify the device 200 to the computing machine 290 as a USB device. Additionally, the first controller can identify the device as a storage device.

In one embodiment, when the device is classified as a USB storage device, the first controller can launch the driver application from the storage component 240 of the device 200 and proceed to transfer a device driver for the device 200 onto the computing machine 290.

The driver application can select a device driver from the storage component 240 and proceed to transfer and/or load the device driver onto the computing machine 290 utilizing the first communication channel 250 of the device. Once transferred or loaded onto the computing machine 290, the computing machine 290 can proceed to utilize the device driver to communicate with and/or to control the computing machine. In one embodiment, the computing machine 290 additionally configures, reconfigures, and/or initializes the device 200 utilizing the device driver.

As noted above, the device driver can list which components of the device 200 to utilize when communicating with and/or controlling the device 200. In one embodiment, the device driver lists for the computing machine 290 to utilize the second controller and the second communication channel 270 of the device 200 when communicating with and/or controlling the device 200.

In one embodiment, when utilizing the second controller and the second communication channel 270, the computing machine 290 can cease using the first controller and the first communication channel 250 of the device 200. Additionally, the second controller can update a classification of the device 200 identified to the computing machine 290.

As noted above and as illustrated in FIG. 2, the second controller can identify the device 200 as a USB 3.0 device which includes an input device 200, an output device 200, a communication device 200, and/or a storage device 200. In other embodiments, the second controller can identify the device 200 as additional device types which can include additional devices and/or components in addition to and/or in lieu of those noted above and illustrated in FIG. 2.

Figure 3:
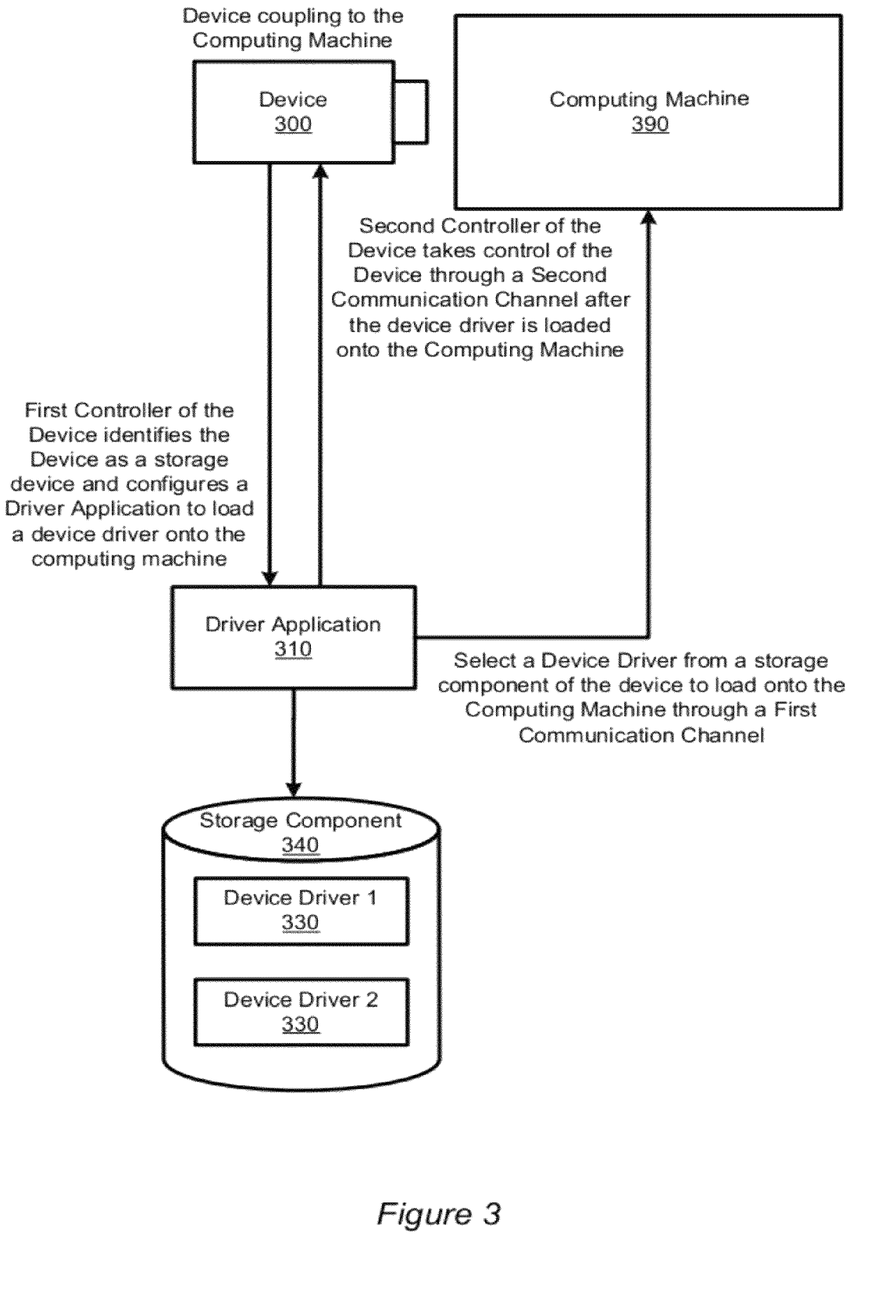
FIG. 3 illustrates a block diagram of a device driver being loaded onto a computing machine and the computing machine communicating with the device according to another embodiment of the invention.

FIG. 3 illustrates a block diagram of a device driver 330 being loaded onto a computing machine 390 and the computing machine 390 communicating with the device 300 according to an embodiment of the invention. As illustrated in FIG. 3, a device 300 can initially couple to a computing machine 390 through an interface component of the device 300. The device 300 can couple to the computing machine 390 in response to a user accessing the device 300.

Once coupled to the computing machine 390, a first controller of the device 300, a driver application 310 launched from a storage component 340 of the device 300, and/or the computing machine 390 can be configured to determine whether the device driver 330 for the device 300 is already loaded onto the computing machine 390.

If it is determine that a device driver 330 for the device 300 is not already loaded onto the computing machine 390, a first controller of the device 300 proceeds to identify the device 300 as a storage device to the computing machine 390. In one embodiment, the first controller additionally identifies the device as a USB device. Additionally, the first controller launches the driver application 310 from the storage component 340 and configures the driver application 310 to load a device driver 330 onto the computing machine 390.

In one embodiment, the driver application 310 is additionally configured by the first controller to identify an operating system utilized by the computing machine 390. When identifying the operating system, the driver application 310 can access a file on the computing machine 390 or the driver application 310 can query the computing machine 390 for the type and version of operating system being used. Once the operating system has been identified, the driver application 310 can proceed to select and load a device driver 330 onto the computing machine 390.

As illustrated in FIG. 3, the driver application 310 accesses the storage component 340 to select a device driver 330. As noted above and as illustrated in FIG. 3, the storage component 340 can store at least one device driver 330 and the device drivers 330 on the storage component 340 can correspond to different operating systems which the computing machine 390 can utilize.

After selecting a device driver 330, the driver application 310 can proceed to load the selected device driver 330 onto the computing machine 390 through a first communication channel of the device 300. Once the device driver 330 has been loaded onto the computing machine 390, the computing machine 390 can configure, reconfigure, and/or initialize the device 300.

In another embodiment, if the first controller, the driver application 310, and/or the computing machine 390 previously determined that a device driver 330 for the device 300 is already loaded onto the computing machine 390, the computing machine 390 can proceed to utilize the loaded device driver 330 to configure, reconfigure, and/or initialize the device 300.

When configuring, reconfiguring, and/or initializing the device 300, a second controller of the device 300 can be configured to take control of the device 300 through a second communication channel of the device. As noted above, the device driver 330 can list for the computing machine 390 to utilize the second controller and the second communication channel when communicating with and/or when controlling the device.

Figure 4:
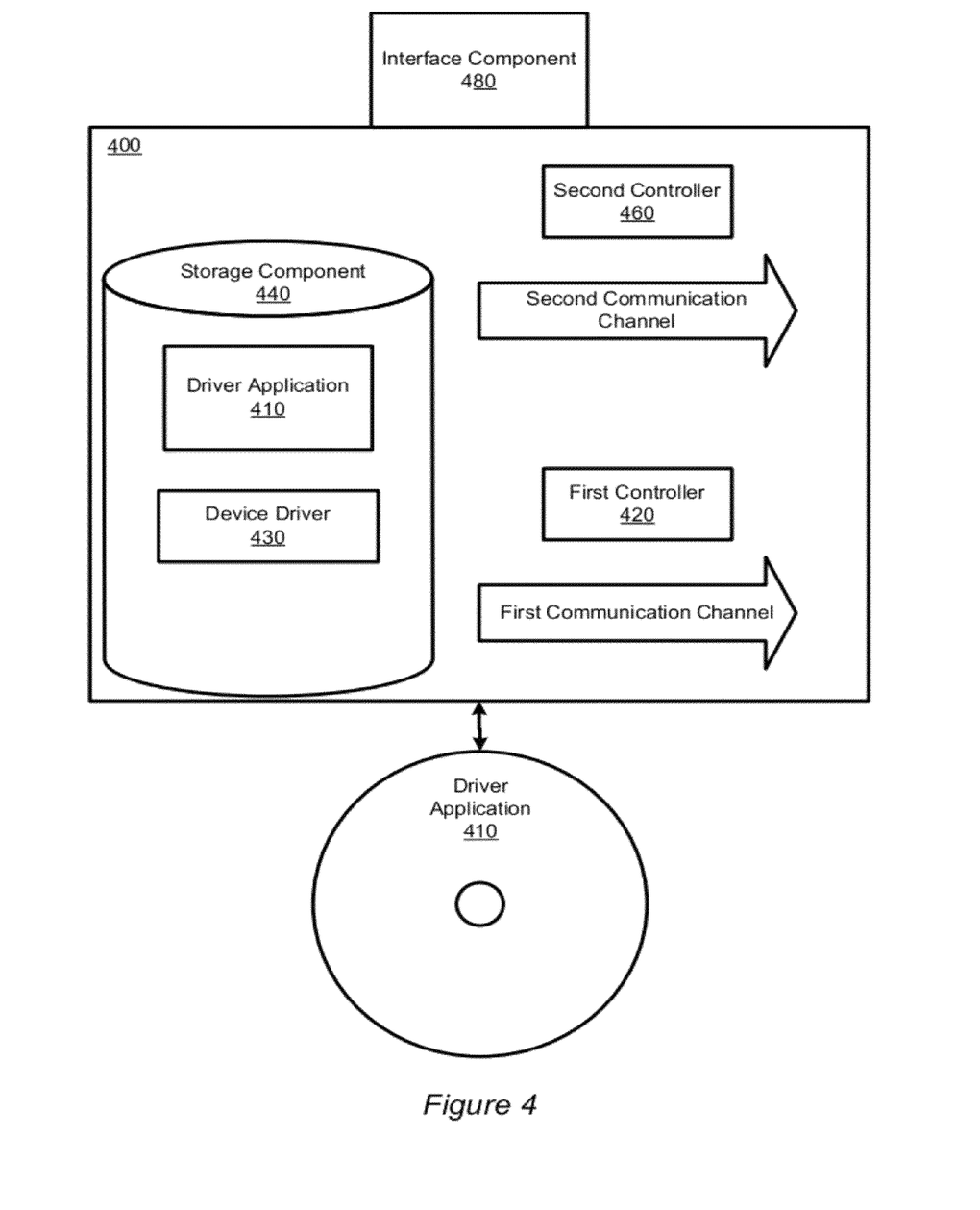
FIG. 4 illustrates a device with an embedded device application and a device application stored on a storage component being accessed by the device according to an embodiment of the invention.

FIG. 4 illustrates a device 400 with an embedded device application 410 and a device application 410 stored on a storage component 440 being accessed by the device 400 according to an embodiment of the invention. For the purposes of this description, a storage component 440 is any tangible apparatus that contains, stores, communicates, or transports the driver application 410 for use by or in connection with the device 400. As noted above, in one embodiment, the driver application 410 is firmware that is embedded into one or more components of the device 400 as ROM. In other embodiments, the driver application 410 is a software application which is stored and accessed from a storage component 440 or any other form of computer readable medium that is coupled to the device 400.

Figure 5:
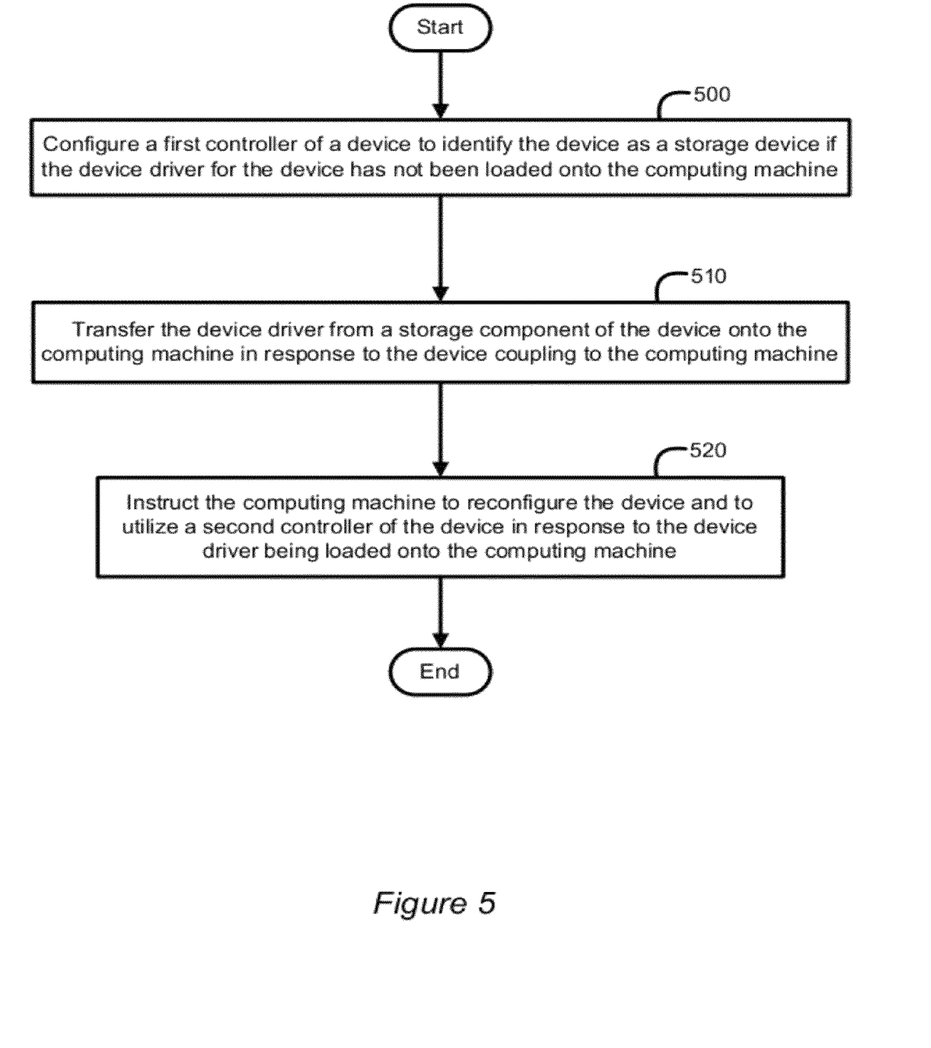
FIG. 5 is a flow chart illustrating a method for loading a device driver onto a computing machine according to an embodiment of the invention.

FIG. 5 is a flow chart illustrating a method for loading a device driver onto a computing machine according to an embodiment of the invention. The method of FIG. 5 uses a device coupled to an interface component, a first controller, a first communication channel, a storage component, a driver application, a second controller and/or a second communication channel. In other embodiments, the method of FIG. 5 uses additional components and/or devices in addition to and/or in lieu of those noted above and illustrated in FIGS. 1, 2, 3, and 4.

As noted above, an interface component is a component of the device which can couple and interface with a computing machine. In one embodiment, the interface component physically couples with the computing machine by engaging a receiving port of the computing machine. The interface component can include at least one from the group consisting of a USB interface, a USB 3.0 interface, a SATA interface, an ESATA interface, a firewire interface, and/or a serial interface.

As noted above, the interface component can engage a receiving port of the computing machine. A receiving port of the computing machine is a component and/or device of the computing machine configured to engage the interface component. The receiving port can engage the interface component of the device by physically coupling with the interface component. In one embodiment, the receiving port can include a USB port, a USB 3.0 port, a SATA port, an ESATA port, a firewire port, and/or a serial port.

In another embodiment, the interface component and the receiving port can includes wireless communication devices configured to communicate with one another wirelessly. In other embodiments, the interface component and/or the receiving port can include additional interfaces and/or components configured to couple and interface the device to the computing machine.

Once the device is coupled to a computing machine, a first controller of the device identifies the device as a storage device to the computing machine if at least one device driver for the device has not been loaded onto the computing machine 500. In one embodiment, the first controller additionally identifies the device as a USB device to the computing machine. The first controller is configured to send and/or receive one or more instructions to a storage component of the device and the computing machine through a first communication channel of the device.

When the device is identified as a storage device, the first controller further sends one or more instructions to launch a device application from a storage component of the device. The device application is an application which is configured to select, transfer, and/or load at least one driver from the storage component onto the computing machine.

Additionally, the driver application selects a device driver from the storage component and proceeds to transfer the device driver onto the computing machine in response to the device coupling to the computing machine 510. When transferring the device driver, the first controller and/or the device application utilizes the first communication channel to transfer the device driver.

As noted above, a device driver is software and/or firmware utilized by the computing machine to communicate with the device and/or for controlling the device. Further, the device driver can identify the device and/or list one or more components of the device for the computing machine to utilize once the device driver has been loaded onto the computing machine.

In one embodiment, when selecting a device driver to load onto the computing machine, the device application further identifies an operating system of the computing machine and a version of the operating system. The driver application selects at least one of the device drivers to load onto the computing machine in response to the identified operating system.

Once a device driver for the device has been loaded onto the computing machine, the computing machine can configure, reconfigure, and/or initialize the device using the loaded device driver. When configuring, reconfiguring, and/or initializing the device, the computing machine accesses the device driver and determines that the second communication channel and the second controller are to be utilized when communicating with and/or when controlling the device.

As a result, control of the device is transferred to a second controller of the device 520. As noted above, the second controller of the device communicates with the computing machine and controls the device once a device driver for the device has been loaded onto the computing machine. In one embodiment, the second controller is a USB 3.0 controller and additionally identifies the device as USB 3.0 device to the computing machine. In another embodiment, the second controller additionally identifies the device as a storage device, an input device, an output device, and/or a communication device.

In other embodiments, if a device driver for the device has already been loaded onto the computing machine, a device driver from the storage component of the device is not loaded onto the computing machine and control of the device is transferred to a second controller of the device. The computing machine then proceeds to utilize the loaded device driver to communicate with second controller through a second communication channel of the device. The method is then complete. In other embodiments, the method of FIG. 5 includes additional steps in addition to and/or in lieu of hose depicted in FIG. 5.

Figure 6:
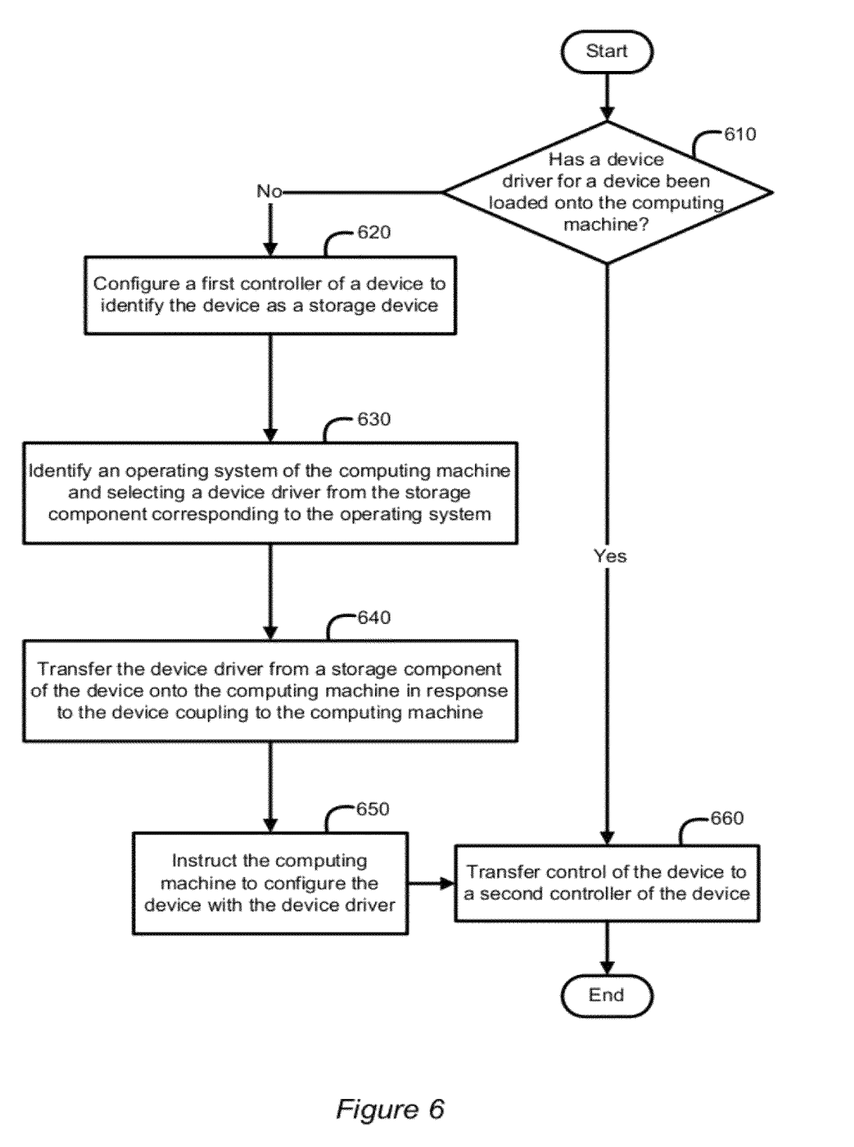
FIG. 6 is a flow chart illustrating a method for loading a device driver onto a computing machine according to another embodiment of the invention.

FIG. 6 is a flow chart illustrating a method for loading a device driver onto a computing machine according to another embodiment of the invention. Similar to the method disclosed in FIG. 5, the method of FIG. 6 uses a device coupled to an interface component, a first controller, a first communication channel, a storage component, a driver application, a second controller and/or a second communication channel. In other embodiments, the method of FIG. 6 uses additional components and/or devices in addition to and/or in lieu of those noted above and illustrated in FIGS. 1, 2, 3, and 4.

As noted above, the device can be or include a storage device, an input device, an output device, and/or a communication device. Additionally, the device can be a USB device, a USB 3.0 device, a SATA device, an ESATA device, a firewire device, and/or a serial device. In other embodiments, the device can be additional devices and/or include additional devices in addition to and/or in lieu of those noted above.

An interface component of the device couples the device to a computing machine through receiving port of the computing machine. In response to coupling to the computing machine, a first controller of the device, a driver application, and/or the computing machine can proceed to determine whether a device driver for the device has been loaded onto the computing machine 610.

The first controller and/or the driver application can automatically launch to determine whether a device driver for the device is already loaded onto the computing machine. In another embodiment, the computing machine is configured by the first controller or the driver application to determine whether a device driver for the device is already loaded onto the computing machine.

If a device driver is already loaded onto the computing machine, the computing machine can proceed to utilize the loaded device driver to communicate with and/or control the device. Additionally, control of the device can be transferred to a second controller of the device 660 through a second communication channel of the device.

As noted above, a second communication channel is utilized by the second controller and the computing machine when a device driver for the device is loaded onto the computing machine. Additionally, the second controller sends and/or receives one or more instructions to communicate with the device or when the computing machine is controlling the device.

If a device driver is not loaded onto the computing machine, the first controller can proceed to identify the device as a storage device to the computing machine in response to the device coupling to the computing machine 620. In one embodiment, the first controller additionally identifies the device as a USB device. In other embodiments, the device can be identified as additional device and/or components by the first controller.

When identified as a storage device, the first controller can launch a driver application from a storage component of the device. The storage component can include non-volatile memory configured to store the driver application and at least one device driver for the device. Further, the first controller configures the driver application to select a device driver from the storage component and transfer the device driver onto the computing machine 640.

As noted above, in one embodiment, before loading a device driver onto the computing machine, the driver application can proceed to identify an operating system utilized by the computing machine and/or a version of the operating system 630. The driver application can identify an operating system and/or a version of the operating system by accessing a file on the computing machine and/or by querying the computing machine. The driver application can then select and transfer the selected device driver onto the computing machine.

Once a device driver has been loaded onto the computing machine, the driver application and/or the first controller can send one or more instructions for the computing machine to configure, reconfigure, and/the device utilizing the loaded device driver 650. In other embodiments, the computing machine proceeds to reconfigure the device with the loaded device driver without instruction from the driver application and/or the first controller.

As noted above, when configuring, reconfiguring, and/or when initializing the device, the computing machine can access the device driver and proceed to identify a classification and/or a functionality of the device. Additionally, the device driver can list which components of the device the computing machine is to utilize when communicating with and/or when controlling the device.

As noted above, when configuring, reconfiguring, and/or initializing the device, the computing machine can identify that the device driver lists for the computing machine to communicate with the second controller of the device through the second communication channel of the device 660. In one embodiment, the computing machine additionally ceases communication with the first controller through the first communication channel of the device once the device has been configured, reconfigured, and/or initialized.

When communicating with the second controller, the second controller identifies itself as a USB 3.0 controller and identifies the device as a USB 3.0 device. In one embodiment, the second controller additionally identifies the device as a storage device, an input device, an output device, and/or a communication device. In other embodiments, the second controller can identify to the device as additional devices and/or components in addition to and/or in lieu of those noted above. The method is then complete or the method can be repeated when the device or another device is coupled to the computing machine. In other embodiments, the method of FIG. 6 includes additional steps in addition to and/or in lieu of those depicted in FIG. 6.

By identify a device as a storage device if a device driver for the device has not been loaded onto a computing machine, a first controller of the device can be configured to load a device driver onto the computing machine. Additionally, by configuring a second controller of the device to control the device in response to the device driver being loaded onto the computing machine, the device can be configured for use in response to the device coupling to the computing machine. As a result, convenience and user friendliness is gained for a user.

Additionally, security and stability is increased for the computing machine by loading proper device drivers for use and preventing incorrect device drivers from being loaded onto the computing machine.

What is claimed is:

1. A device comprising:
an interface component to couple the device to a computing machine;
a first controller and a second controller;
a first communication channel exclusively utilized by the first controller;
a second communication channel exclusively utilized by the second controller;
a non-volatile storage component to store:
   a device driver for the device comprising a list identifying components of the device to utilize when communicating and controlling the device; and
   a driver application executed from the storage component to, in response to the device coupling to the computing machine and a determination that the device driver has not been loaded onto the computing machine:
      identify, using the first controller and the first communication channel, the device as a first storage device;
      load, using the first controller and the first communication channel, the device driver onto the computing machine from the storage component; and
      configure the device to cease using the first controller and the first communication channel and to use the second controller and the second communication channel to access the storage component in response to the device driver being loaded onto the computing machine.

2. The device of claim 1, the second controller to identify the device as a second storage device.

3. The device of claim 1 wherein the second controller controls the device if the device driver for the device is loaded onto the computing machine.

4. The device of claim 2 wherein the first storage device uses a first interface type, and the second storage device uses a second interface type.

5. The device of claim 1 wherein the interface component includes at least one from the group consisting of a USB interface, a USB 3.0 interface, a SATA interface, an ESATA interface, a firewire interface, and a serial interface.

6. A non-transitory computer-readable medium comprising:
a driver application executable by a processor to, in response to a device coupling to a computing machine:
   load a device driver for the device, using a first controller and a first communication channel of the device, from a storage component of the device onto the computing machine if the device driver is not already loaded onto the computing machine, wherein the first communication channel is exclusively utilized by the first controller, wherein the device driver for the device comprises a list identifying components of the device to utilize when communicating and controlling the device; and
   instruct the computing machine to configure the device to cease using the first controller and the first communication channel and to utilize a second controller and a second communication channel of the device to access the storage component of the device in response to the device driver being loaded onto the computing machine, wherein the second communication channel is exclusively utilized by the second controller.

7. The computer-readable medium of claim 6 wherein the first controller of the device identifies the device as a first storage device to the computing machine if the device driver has not been loaded onto the computing machine.

8. The computer-readable medium of claim 6 wherein configuring the device includes the computing machine utilizing the device driver for the device to communicate with the second controller of the device through a second communication channel of the device.

9. The computer-readable medium of claim 7 wherein the second controller identifies the device as a second storage device to the computing machine after the device driver is loaded onto the computing machine.

10. A method comprising:
identifying, by a first controller of a device and using a first communication channel of the device, the device as a first storage device if a device driver for the device has not been loaded onto a computing machine, wherein the first communication channel is exclusively utilized by the first controller;
transferring, by the first controller, the device driver from a storage component of the device onto the computing machine in response to the device coupling to the computing machine, wherein the device driver comprises a list identifying components of the device to utilize when communicating and controlling the device; and
instructing the computing machine to reconfigure the device to cease using the first controller and the first communication channel and to utilize a second controller and a second communication channel of the device to access the storage component of the device, wherein the second communication channel is exclusively utilized by the second controller.

11. The method of claim 10 wherein the computing machine reconfigures the device with the device driver.

12. The method of claim 10 further comprising identifying an operating system of the computing machine and selecting the device driver from the storage component corresponding to the operating system.

13. The method of claim 10 further comprising identifying, by the second controller, the device as a second storage device if the device driver for the device has been loaded onto the computing machine.

14. The method of claim 13 wherein the first storage device uses a first interface type, and the second storage device uses a second interface type.

15. The computer-readable medium of claim 9 wherein the first storage device uses a first interface type, and the second storage device uses a second interface type.

* * * * *

UNITED STATES PATENT AND TRADEMARK OFFICE
CERTIFICATE OF CORRECTION

| | | |
|---|---|---|
| PATENT NO. | : 8,984,539 B2 | Page 1 of 1 |
| APPLICATION NO. | : 13/387301 | |
| DATED | : March 17, 2015 | |
| INVENTOR(S) | : Luke Mulcahy et al. | |

It is certified that error appears in the above-identified patent and that said Letters Patent is hereby corrected as shown below:

> On the Title page, in item (74), Attorney, in column 2, line 2, delete "Development" and insert
> -- Department --, therefor.

Signed and Sealed this
Fourteenth Day of July, 2015

Michelle K. Lee
*Director of the United States Patent and Trademark Office*